(12) United States Patent
Yokoyama et al.

(10) Patent No.: US 11,834,039 B2
(45) Date of Patent: Dec. 5, 2023

(54) FALLING OBJECT DETERMINATION DEVICE, DRIVING SUPPORT SYSTEM, AND FALLING OBJECT DETERMINATION METHOD

(71) Applicant: DENSO CORPORATION, Kariya (JP)

(72) Inventors: Takahisa Yokoyama, Kariya (JP); Noriyuki Ido, Kariya (JP)

(73) Assignee: DENSO CORPORATION, Kariya (JP)

(*) Notice: Subject to any disclaimer, the term of this patent is extended or adjusted under 35 U.S.C. 154(b) by 133 days.

(21) Appl. No.: 17/490,430

(22) Filed: Sep. 30, 2021

(65) Prior Publication Data

US 2022/0017085 A1  Jan. 20, 2022

Related U.S. Application Data

(63) Continuation of application No. PCT/JP2020/014835, filed on Mar. 31, 2020.

(30) Foreign Application Priority Data

Apr. 4, 2019 (JP) ................. 2019-071687

(51) Int. Cl.
*B60W 30/095* (2012.01)
*G06T 7/215* (2017.01)
(Continued)

(52) U.S. Cl.
CPC .......... *B60W 30/095* (2013.01); *B60W 30/09* (2013.01); *B60W 40/10* (2013.01);
(Continued)

(58) Field of Classification Search
CPC ......... B60W 2400/00; B60W 2420/42; B60W 2554/404; B60W 30/09; B60W 30/095; B60W 40/10; G01S 13/862; G01S 13/865; G01S 13/867; G01S 13/878; G01S 13/931; G01S 2013/932; G01S 2013/9324;
(Continued)

(56) References Cited

U.S. PATENT DOCUMENTS

2008/0008355 A1   1/2008  Okamoto et al.
2018/0081368 A1*  3/2018  Watanabe ............ G05D 1/0285
(Continued)

FOREIGN PATENT DOCUMENTS

CN   104698085 A   6/2015
CN   106184093 A   12/2016
(Continued)

*Primary Examiner* — Babar Sarwar
(74) *Attorney, Agent, or Firm* — MASCHOFF BRENNAN

(57) ABSTRACT

A falling object determination device configured to be mounted on a vehicle is provided. The falling object determination device includes an acquisition unit configured to acquire, as a first detection signal, information indicating displacement of an object near a cargo bed of a nearby vehicle which travels near the own vehicle; and a control unit configured to calculate at least one of a vibration frequency, an amplitude and a size of the object near the cargo bed by using the first detection signal, and performs a determination whether the object near the cargo bed is an object which is likely to fall from the cargo bed or an object which is falling from the cargo bed in accordance with a calculation result.

13 Claims, 5 Drawing Sheets

(51) Int. Cl.
*G06V 20/56* (2022.01)
*B60W 30/09* (2012.01)
*B60W 40/10* (2012.01)
*G06T 7/00* (2017.01)

(52) U.S. Cl.
CPC ............ *G06T 7/0004* (2013.01); *G06T 7/215* (2017.01); *G06V 20/56* (2022.01); *B60W 2400/00* (2013.01); *B60W 2420/42* (2013.01); *B60W 2554/404* (2020.02); *G06T 2207/30252* (2013.01)

(58) Field of Classification Search
CPC . G01S 2013/93271; G01S 2013/93272; G06T 2207/30252; G06T 7/0004; G06T 7/215; G06V 20/56; G06V 20/58; G08G 1/16
See application file for complete search history.

(56) References Cited

U.S. PATENT DOCUMENTS

| | | | |
|---|---|---|---|
| 2018/0208196 A1* | 7/2018 | Kurata | G06V 20/584 |
| 2018/0336785 A1* | 11/2018 | Ghannam | G08G 1/04 |
| 2019/0043274 A1* | 2/2019 | Hayakawa | G08G 1/164 |
| 2020/0135029 A1* | 4/2020 | Raichelgauz | G06F 18/23 |
| 2020/0231160 A1* | 7/2020 | Zass | B60W 30/18163 |

FOREIGN PATENT DOCUMENTS

| | | |
|---|---|---|
| DE | 102016210056 A1 | 12/2017 |
| JP | 2010-108371 A | 5/2010 |
| JP | 2017-182139 A | 10/2017 |

\* cited by examiner

FALLING OBJECT DETERMINATION DEVICE, DRIVING SUPPORT SYSTEM, AND FALLING OBJECT DETERMINATION METHOD

CROSS-REFERENCE TO RELATED APPLICATION

The present application is a continuation application of International Application No. PCT/JP2020/014835, filed on Mar. 31, 2020, which claims priority to Japanese Patent Application No. 2019-071687, filed on Apr. 4, 2019. The contents of these applications are incorporated herein by reference in their entirety.

BACKGROUND

Technical Field

The present disclosure relates to a falling object determination device, a driving support system, and a falling object determination method.

Background Art

As driving support, for example, a technology of comparing an image captured by a camera and templates prepared in advance to determine a pedestrian on a road and avoiding a collision is known.

SUMMARY

In the present disclosure, provided is a falling object determination device as the following.

The falling object determination device includes an acquisition unit configured to acquire, as a first detection signal, information indicating displacement of an object near a cargo bed of a nearby vehicle; and a control unit configured to calculate at least one of a vibration frequency, an amplitude and a size of the object near the cargo bed by using the first detection signal, and performs a determination whether the object near the cargo bed is an object which is likely to fall from the cargo bed or an object which is falling from the cargo bed in accordance with a calculation result.

DETAILED DESCRIPTION OF THE PREFERRED EMBODIMENTS

As driving support, for example, a technology disclosed in JP 2008-15770 A is known. However, it has been difficult to detect an object which is likely to fall from or an object which is currently falling from a cargo bed of a nearby vehicle which travels near an own vehicle. Further, it has been difficult to prepare templates for these objects, and thus it has been impossible to determine these objects. Thus, a technology which is capable of determining an object which is likely to fall or an object which is currently falling has been desired.

According to one aspect of the present disclosure, a falling object determination device configured to be mounted on a vehicle is provided. The falling object determination device includes an acquisition unit configured to acquire, as a first detection signal, information indicating displacement of an object near a cargo bed of a nearby vehicle which travels near the own vehicle; and a control unit configured to calculate at least one of a vibration frequency, an amplitude and a size of the object near the cargo bed by using the first detection signal, and performs a determination whether the object near the cargo bed is an object which is likely to fall from the cargo bed or an object which is falling from the cargo bed in accordance with a calculation result.

According to the falling object determination device, at least one of the vibration frequency, the amplitude and the size of the object near the cargo bed is calculated using the first detection signal, and whether the object near the cargo bed is an object which is likely to fall or an object which is falling is determined in accordance with the calculation result. It is therefore possible to determine an object which is likely to fall and an object which is currently falling. Note that the present disclosure can be implemented as a falling object determination method.

A. First Embodiment

Figure 1:
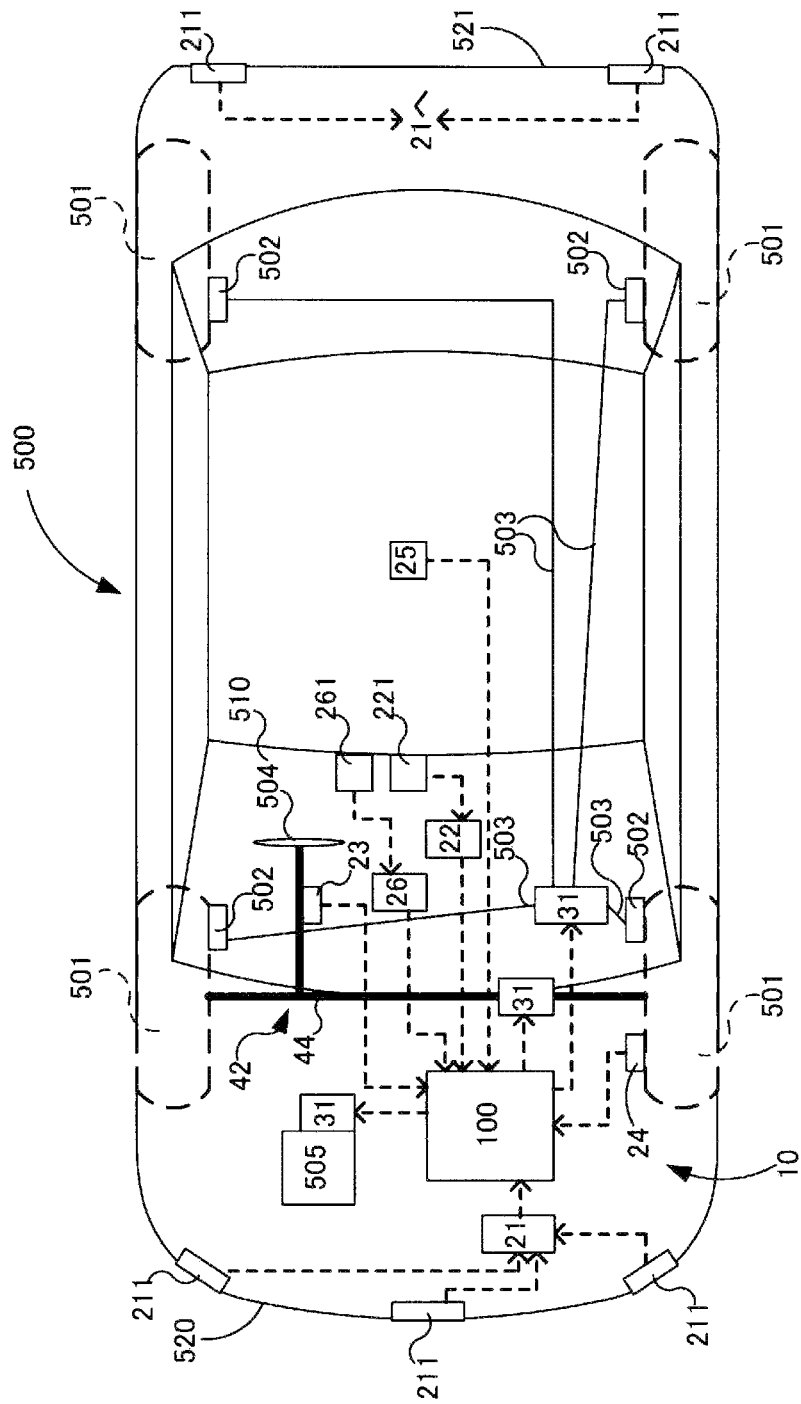
FIG. 1 is an explanatory diagram illustrating an example of a vehicle on which a falling object determination device is mounted.

As illustrated in FIG. 1, a falling object determination device 100 for a vehicle according to a first embodiment is used in a state where the falling object determination device 100 is mounted on a vehicle 500. The falling object determination device 100 is only required to include at least a control unit and an acquisition unit, and a driving support system 10 includes a radar ECU 21 as a detector, a millimeter wave radar 211, a camera ECU 22, a camera 221, an event camera ECU 26, an event camera 261, and a driving support execution device 31 in addition to the falling object determination device 100. The vehicle 500 in the first embodiment further includes a rotational angle sensor 23, a wheel speed sensor 24, and a yaw rate sensor 25. The vehicle 500 further includes wheels 501, braking devices 502, a braking line 503, a steering wheel 504, a windshield 510, a front bumper 520, and a rear bumper 521. The vehicle 500 includes at least one of an internal combustion or an electric motor as a driving force source 505 for vehicle traveling.

The radar ECU 21 is connected to the millimeter wave radar 211 which emits radio waves and detects reflected waves from a target, and the radar ECU 21 generates and outputs a second detection signal representing the target with detection points, that is, reflection points by using the reflected waves acquired by the millimeter wave radar 211. The camera ECU 22 is connected to a monocular camera 221, specifies a position of a cargo bed of a nearby vehicle which travels near the vehicle 500 from a captured image acquired by the camera 221, and generates and outputs a second detection signal indicating whether there is an object near the cargo bed of the nearby vehicle (hereinafter, referred to as an "object near a cargo bed") determined through pattern matching processing using a shape pattern of an object prepared in advance. The "object near a cargo bed" is an object, at least part of which exists on the cargo bed. For example, the object near a cargo bed includes an elongated object, part of which protrudes from the cargo bed, an object, part of which hangs from the cargo bed, and an object which swings in a vertical direction to thereby float from the cargo bed. While the nearby vehicle is, for example, a vehicle 500 which travels in front of the vehicle 500, the nearby vehicle is not limited to the preceding vehicle and may be a vehicle which travels side-by-side with the vehicle 500 or a vehicle which travels on an oncoming lane of the vehicle 500 behind the vehicle 500. The position of the cargo bed of the nearby vehicle is specified through, for example, semantic segmentation using machine learning. For example, pixel value information (R, G, B) and coordinate information as position information are associated with pixels included in each frame of the captured image.

The event camera ECU 26 is connected to the event camera 261 which can acquire change of brightness values of an object in association with displacement of the object in units of several microseconds, generates information of changed pixels for which change of the brightness values in accordance with displacement of the object is equal to or greater than a predetermined threshold and outputs the information as a first detection signal. The event camera ECU 26 and the event camera 261 correspond to a first detector which acquires information regarding the changed pixels for which values are changed in accordance with displacement of the object and outputs the information as the first detection signal.

Each of the ECUs 21, 22 and 26 is a microprocessor including a computation unit, a storage unit and an input/output unit. Note that the radar ECU 21 and the millimeter wave radar 211 which correspond to a detector for typically measuring a distance between an own vehicle and a target by emitting detection waves and detecting reflected waves and reflection points, detect a distance, relative speed and an angle of the target with respect to the vehicle 500. As this detector, a laser radar (lidar) or an ultrasonic detector which emits sound waves and detects reflected waves of the sound waves may be used in addition to the millimeter wave radar 211. The camera ECU 22 and the camera 221 which are detectors which can recognize a shape of the target in a three-dimensional manner and correspond to an imaging device. A 3D lidar may be used in addition to the camera 221 as the imaging device. The camera 221 may be a stereo camera or a multi-camera constituted with two or more cameras. As the event camera 261, an imaging device which can output a detection signal comprised of a frame group at a high frame rate, for example, at 1000 fps at which vibration of the object near the cargo bed can be calculated may be used in addition to an image sensor which does not output a detection signal comprised of a frame group.

The vehicle 500 includes the braking devices 502 for implementing braking of the vehicle 500, and the steering wheel 504 for implementing steering of the vehicle 500. Each braking device 502 is provided at the corresponding one of the wheels 501. Each braking device 502 is, for example, a disk brake or a drum brake, implements braking of the vehicle 500 by braking each wheel 501 with braking force in accordance with a brake fluid pressure supplied via the braking line 503 in accordance with brake pedal operation by a driver. The braking line 503 includes a brake piston which generates a brake fluid pressure in accordance with the brake pedal operation and a brake fluid line. Note that as the braking line 503, it is also possible to employ a configuration where actuators provided at the respective braking devices 502 are activated using a control signal line in place of the brake fluid line. The steering wheel 504 is connected to wheels 501 on a front side via a steering device 42 including a steering rod, a steering mechanism and a steering shaft 44.

Figure 2:
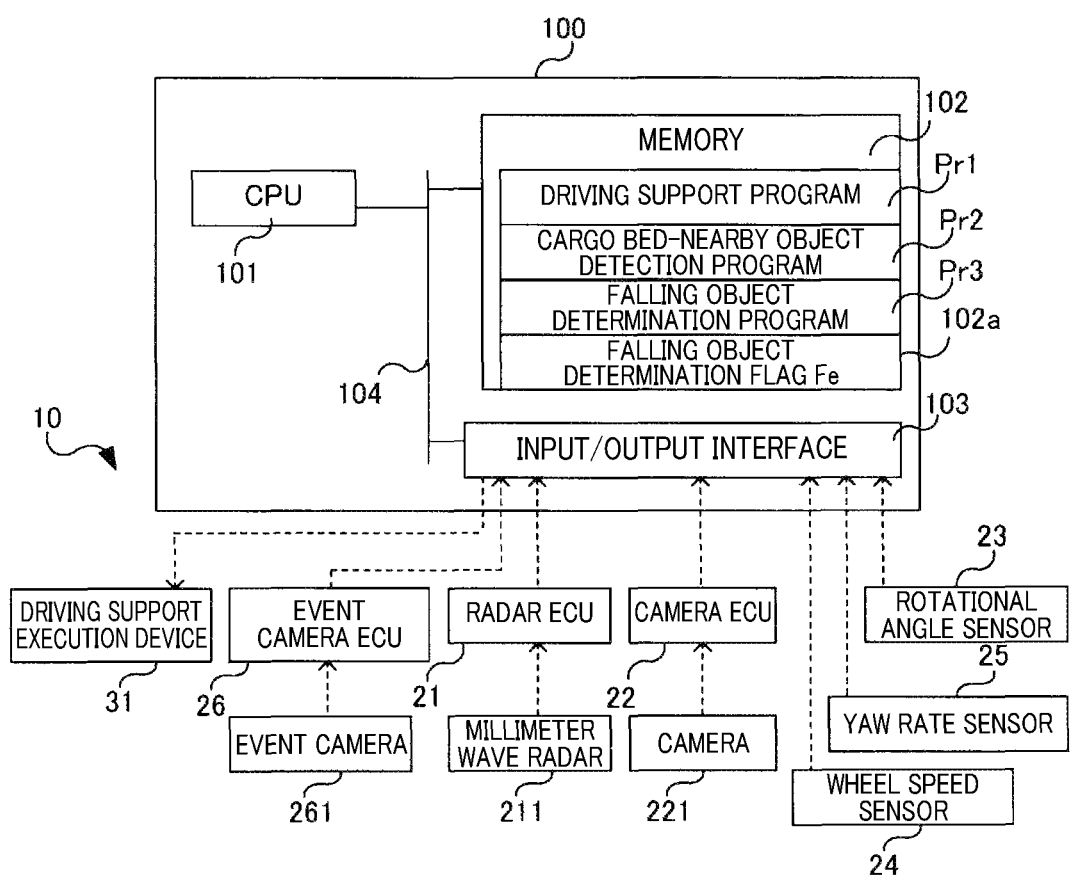
FIG. 2 is a block diagram illustrating a functional configuration of the falling object determination device.

As illustrated in FIG. 2, the falling object determination device 100 includes a central processing unit (CPU) 101 as a control unit, and a memory 102, an input/output interface 103 as an acquisition unit, and a bus 104. The CPU 101, the memory 102 and the input/output interface 103 are connected via the bus 104 so as to be able to perform bidirectional communication. The memory 102 includes a first memory, for example, a ROM, and a second memory, for example, a RAM. The first memory stores, in a non-volatile manner and in a read-only manner, a driving support program Pr1 for executing driving support of the own vehicle, a cargo bed-nearby object detection program Pr2 for detecting an object near a cargo bed using a detection result of the event camera 261, and a falling object determination program Pr3 for determining whether an object near a cargo bed is an object which is likely to fall or an object which is currently falling from the cargo bed. The second memory allows reading and writing by the CPU 101 and has a falling object determination flag storage area 102a. A "falling object" is an object whose collision with a vehicle cannot be permitted, and is an object including an object which is likely to fall and an object which is currently falling. An "object whose collision with a vehicle cannot be permitted" is an object which causes a problem in traveling of the vehicle 500 in a case where the vehicle 500 collides with the object. The CPU 101 implements functions as a control unit by loading the driving support program Pr1, the cargo bed-nearby object detection program Pr2, and the falling object determination program Pr3 stored in the memory 102 to a read-write memory and executing the programs. Note that the CPU 101 may be a single CPU or a plurality of CPUs which execute the respective programs, or may be a multicore type CPU which can execute a plurality of programs at the same time.

The radar ECU 21, the camera ECU 22, the event camera ECU 26, the rotational angle sensor 23, the wheel speed sensor 24, the yaw rate sensor 25 and a driving support execution device 31 are respectively connected to the input/output interface 103 via a control signal line. Detection signals are input from the radar ECU 21, the camera ECU 22, the event camera ECU 26, the rotational angle sensor 23, the wheel speed sensor 24 and the yaw rate sensor 25. A control signal which gives an instruction of driving force in accordance with requested torque, a control signal which gives an instruction of a braking level, and a control signal which gives an instruction of a steering angle are output to the driving support execution device 31. Thus, the input/output interface 103 functions as an acquisition unit for acquiring detection signals detected by various kinds of sensors, including the first detection signal and the second detection signal.

The millimeter wave radar 211 is a sensor which emits millimeter waves and receives reflected waves reflected by a target. In the present embodiment, the millimeter wave radars 211 are disposed at the front bumper 520 and the rear bumper 521. An unprocessed detection signal output from the millimeter wave radar 211 is processed at the radar ECU 21 and input to the falling object determination device 100 as a detection signal comprised of a detection point or a detection point sequence indicating one or a plurality of representative positions of the target. Alternatively, a signal indicating an unprocessed received wave may be input to the falling object determination device 100 from the millimeter wave radar 211 as the detection signal without the radar ECU 21 being provided. In a case where an unprocessed received wave is used as the detection signal, the falling object determination device 100 executes signal processing for specifying a position and a distance of the target.

The camera 221, which is an imaging device including one imaging element such as a CCD or one imaging element array, is a sensor which outputs contour information or shape information of an object as image data which is a detection result by receiving visible light. The image data captured by the camera 221 is subjected to the above-described processing by the camera ECU 22, and the second detection signal indicating whether there is an object near the cargo bed is generated. In the present embodiment, the camera 221 is disposed at the center of an upper part of the windshield 510. The image data output from the camera 221 may be monochrome image data. In this case, brightness values are used for segmentation.

The event camera 261 is an imaging device of an event detection type which includes a plurality of pixels constituted with a signal imaging element and which can detect an event of change of brightness values of an object which occurs in association with displacement of the object in units of several microseconds. The event camera 261 outputs, as a detection result, information, for example, received light intensity and coordinates of pixels regarding changed pixels corresponding to positions at which the brightness values are changed in the object, instead of outputting a detection result in frame unit obtained by scanning all of the plurality of pixels. Thus, displacement of the object near the cargo bed can be detected by using the detection result of the event camera 261. In the present embodiment, the event camera ECU 26 generates information including coordinates of positions and brightness values regarding the changed pixels for which change of the detected brightness values is equal to or greater than a predetermined threshold, that is, information indicating displacement of the object near the cargo bed, and outputs the information as the first detection signal. The event camera 261 only requires to output information regarding the changed pixels for which values are changed in accordance with the displacement of the object, and an imaging device which can output a detection signal comprised of a frame group at a high frame rate, for example, at 1000 fps at which vibration of the object near the cargo bed can be calculated may be used, in addition to an image sensor which does not output a detection signal comprised of a frame group.

The rotational angle sensor 23, which is a torque sensor which detects an amount of twist occurring at the steering rod by steering of the steering wheel 504, that is, steering torque, as a voltage value proportional to the amount of twist, detects a steering angle of the steering wheel 504. In the present embodiment, the rotational angle sensor 23 is provided at the steering rod which connects the steering wheel 504 and the steering mechanism.

The wheel speed sensor 24, which is a sensor detecting rotational speed of the wheel 501, is provided at each wheel 501. A detection signal output from the wheel speed sensor 24 is a voltage value proportional to wheel speed or a pulse wave indicating an interval in accordance with wheel speed. Information such as vehicle speed and a travel distance of the vehicle can be obtained by using the detection signal from the wheel speed sensor 24.

The yaw rate sensor 25 is a sensor which detects rotational angular velocity of the vehicle 500. The yaw rate sensor 25 is, for example, disposed at a central portion of the vehicle. A detection signal output from the yaw rate sensor 25 is a voltage value proportional to a rotational direction and angular velocity.

The driving support execution device 31 controls increase and decrease of output of the driving force source 505 in accordance with accelerator pedal operation by the driver or regardless of the accelerator pedal operation by the driver, implements braking by the braking devices 502 regardless of brake pedal operation by the driver or implements steering by the steering device 42 regardless of operation of the steering wheel 504 by the driver.

Figure 3:
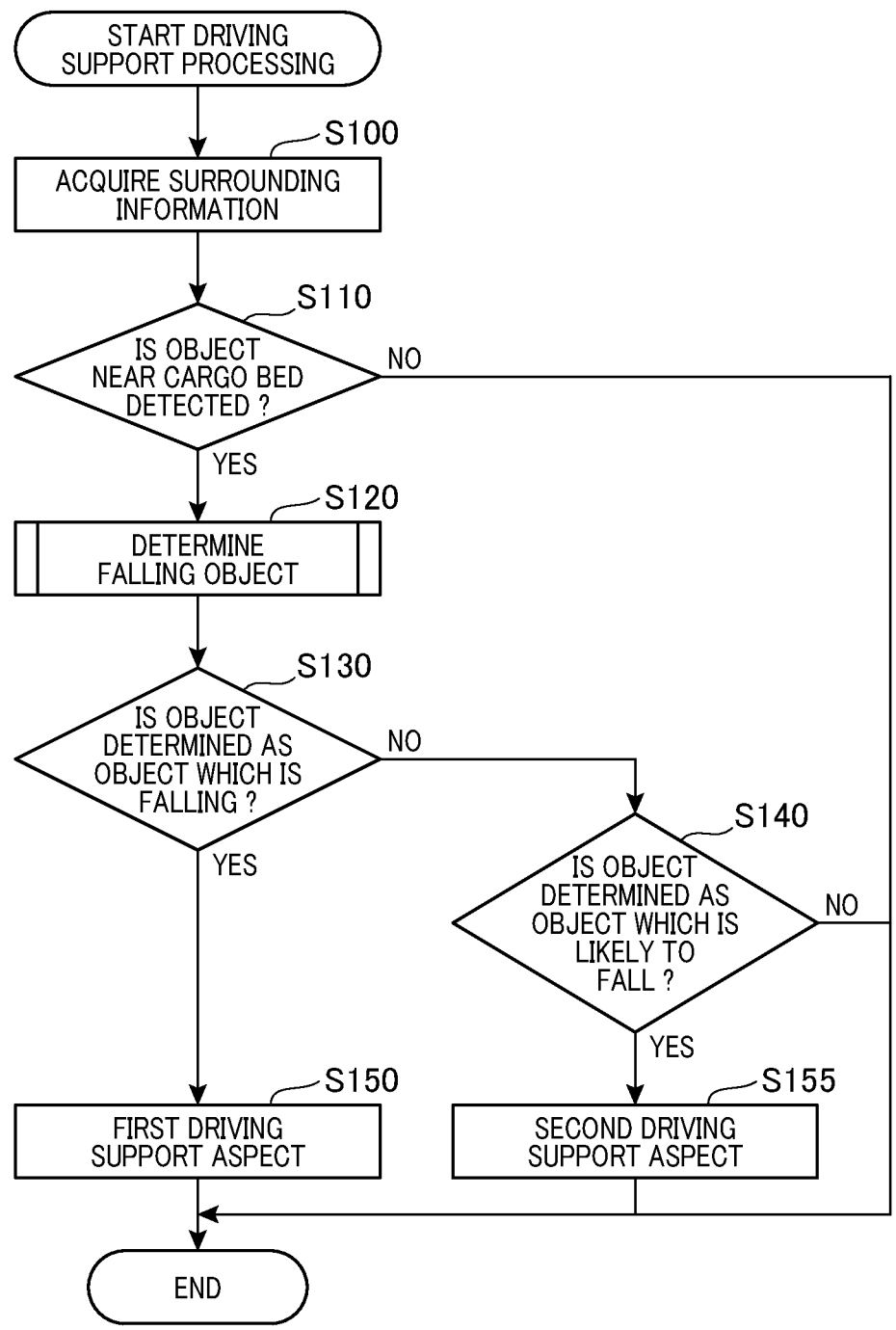
FIG. 3 is a flowchart illustrating an example of driving support processing.

Driving support processing to be executed by the falling object determination device 100 according to the first embodiment will be described. Processing routine illustrated in FIG. 3 is repeatedly executed at predetermined time intervals, for example, at intervals of several milliseconds, for example, from when a control system of the vehicle is started until when the control system is stopped, or from when a start switch is turned on until when the start switch is turned off. The driving support processing illustrated in FIG. 3 is executed by the CPU 101 by executing the driving support program Pr1. Note that the driving support processing illustrated in FIG. 3 is processing of determining whether the object near the cargo bed is an object which is likely to fall from the cargo bed (hereinafter, referred to as an "object which is likely to fall") or an object which is currently falling from the cargo bed (hereinafter, referred to as an "object which is falling") and determining an aspect of driving support to be executed.

The CPU 101 acquires surrounding information, that is, the second detection signal via the input/output interface 103 (step S100). The surrounding information includes, for example, information regarding a position of the cargo bed of the nearby vehicle detected by the millimeter wave radar 211 and the camera 221 and a size of the object near the cargo bed.

The CPU 101 determines whether the object near the cargo bed of the vehicle which travels near the own vehicle, that is, the object near the cargo bed is detected by using the acquired surrounding information (step S110). The CPU 101 determines that the object near the cargo bed exists in a case where a target corresponding to the object near the cargo bed is detected in an image captured by the camera 221. More specifically, for example, the CPU 101 detects a predetermined range on a license plate of the nearby vehicle as the position of the cargo bed and detects whether at least part of the object exists on the cargo bed. The CPU 101 executes cargo bed-nearby object detection processing using the detection result of the event camera 261 which will be described later in parallel to the driving support processing and determines whether there is an object near the cargo bed by using the cargo bed-nearby object information obtained through the cargo bed-nearby object detection processing and the surrounding information detected in the present processing routine.

In a case where the object near the cargo bed is detected (step S110: Yes), the CPU 101 determines whether the object near the cargo bed is a falling object (step S120). In the present embodiment, in a case where the object near the cargo bed may fall, the object near the cargo bed is determined as the object which is likely to fall, and more specifically, a falling object determination flag Fe is set as Fe=1. Further, in a case where the object near the cargo bed is falling, the object near the cargo bed is determined as the object which is falling, and more specifically, the falling object determination flag Fe is set as Fe=2. The falling object determination processing will be described in detail later. On the other hand, in a case where the object near the cargo bed is not detected (step S110: No), the CPU 101 terminates the driving support processing.

The CPU 101 determines whether the object near the cargo bed is an object which is falling (step S130). More specifically, the CPU 101 determines whether the falling object determination flag Fe is 2. In a case where the object near the cargo bed is an object which is falling (step S130: Yes), the CPU 101 determines the aspect of the driving support as a first driving support aspect (step S150). The first driving support aspect is, for example, an aspect in which sudden braking is performed or an aspect in which acceleration/deceleration or steering are controlled in accordance with a falling direction of the object which is falling so as to avoid the object which is falling. Further, the first driving support aspect may be an aspect in which the driver is notified that there is an object which is falling. Meanwhile, in a case where the object near the cargo bed is not an object which is falling (step S130: No), the CPU 101 determines whether the object near the cargo bed is an object which is likely to fall (step S140). More specifically, the CPU 101 determines whether the falling object determination flag Fe is 1. In a case where the object near the cargo bed is an object which is likely to fall (step S140: Yes), the CPU 101 determines the aspect of the driving support as a second driving support aspect for which a degree of support is lower than a degree of support in the first driving support aspect (step S155). The second driving support aspect is, for example, a preventive aspect in which acceleration/deceleration for increasing a distance between the own vehicle and the nearby vehicle, or steering control for lane change or overtaking the nearby vehicle is controlled to avoid the own vehicle from traveling near the nearby vehicle. Further, the second driving support aspect may be an aspect in which the driver is notified that there is an object which is likely to fall. Meanwhile, in a case where the object near the cargo bed is not an object which is likely to fall (step S140: No), the driving support processing is terminated.

Figure 4:
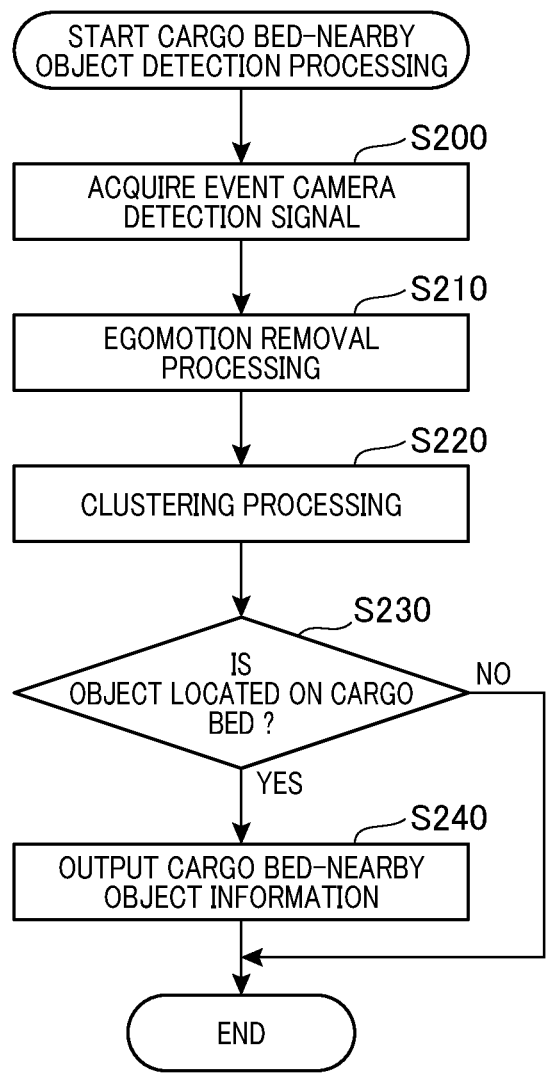
FIG. 4 is a flowchart illustrating an example of cargo bed-nearby object detection processing.

The cargo bed-nearby object detection processing to be executed by the falling object determination device 100 according to the first embodiment will be described. Processing routine illustrated in FIG. 4 is repeatedly executed at predetermined intervals, for example, at intervals of several microseconds, for example, from when the control system of the vehicle is started until when the control system is stopped or from when the start switch is turned on until when the start switch is turned off. The cargo bed-nearby object detection processing illustrated in FIG. 4 is executed by the CPU 101 by executing the cargo bed-nearby object detection program Pr2. In other words, the driving support processing illustrated in FIG. 3 and moving object detection processing illustrated in FIG. 4 are executed in parallel, and a detection result of a moving object in the moving object detection processing is utilized in the driving support processing.

The CPU 101 acquires an event camera detection signal (step S200). Specifically, the CPU 101 receives the first detection signal output from the event camera ECU 26 over time and acquires information regarding one or a plurality of changed pixels for which brightness values are changed, detected by the event camera 261. In a case where an object such as a human, a bicycle and a vehicle is being displaced, that is, moving, the first detection signal includes information regarding a plurality of changed pixel groups indicating contour of the object. The CPU 101 executes egomotion removal processing on the acquired information regarding the changed pixels (step S210). Egomotion means behavior of a measurement system itself in three-dimensional space, and in a case of the event camera 261 mounted on the vehicle, means behavior of the vehicle. Egomotion is obtained by obtaining movement of the own vehicle in a vertical direction and in a horizontal direction using vehicle speed acquired by the wheel speed sensor 24 and a yaw rate acquired by the yaw rate sensor 25. The egomotion processing is a processing for extracting displacement of the object itself by removing changed pixels indicating relative displacement of the object for which brightness values are changed because of behavior of the own vehicle among the detected changed pixels.

The CPU 101 executes clustering processing using information regarding the changed pixels subjected to the egomotion removal processing (step S220). The clustering processing is processing of extracting one object from a plurality of changed pixels and is processing of associating changed pixels which form one object. The clustering processing in the present embodiment is, for example, executed by associating changed pixels which move in the same direction over time as changed pixel groups which form one object. Other than the above, the clustering processing may be executed by associating changed pixels, a distance between which is shorter than a predetermined distance as a pixel group indicating the same object by using position coordinates of the changed pixels, or by associating changed pixels for which brightness values approximate each other as a pixel group indicating the same object by using the brightness values of the changed pixels. An object which is formed by the changed pixel group may be obtained through the clustering processing, and matching between the object and a model pattern which is a determination model may be performed.

The CPU 101 determines whether the extracted object is located on the cargo bed (step S230). Specifically, the CPU 101 determines whether the extracted object is located on the cargo bed of the nearby vehicle using position coordinates of the changed pixel group which form the extracted object. In a case where the CPU 101 determines that the extracted object is located on the cargo bed (step S230: Yes), the CPU 101 outputs information indicating that the object near the cargo bed is detected and cargo bed-nearby object information indicating displacement information of the object near the cargo bed (step S240) and terminates the present processing routine. As described above, the cargo bed-nearby object information is used in the driving support processing illustrated in FIG. 3. In a case where the CPU 101 determines that the extracted object is not located on the cargo bed (step S230: No), the CPU 101 terminates the present processing routine.

Figure 5:
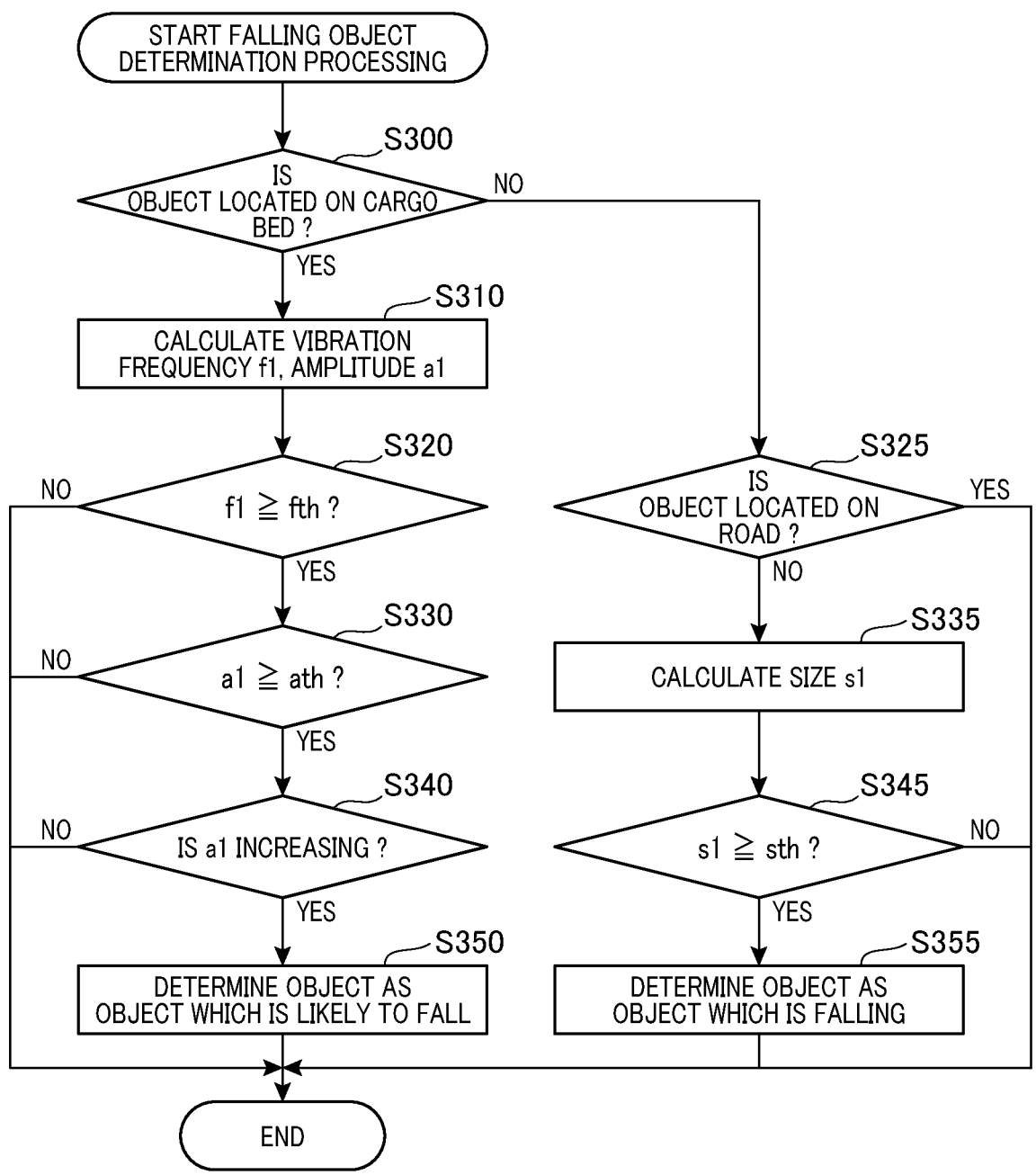
FIG. 5 is a flowchart illustrating an example of falling object determination processing.

The falling object determination processing illustrated in FIG. 5 is a series of processing performed by the CPU 101 determining whether the object near the cargo bed is an object which is likely to fall or an object which is falling in step S120 in FIG. 3. First, the CPU 101 determines whether the object near the cargo bed still exists on the cargo bed (step S300).

In a case where the object near the cargo bed is located on the cargo bed (step S300: Yes), in the present embodiment, the CPU 101 calculates a vibration frequency f1 and an amplitude a1 of the object near the cargo bed by using the first detection signal, more specifically, cargo bed-nearby object information which can be obtained from the first detection signal (step S310). Subsequently, the CPU 101 determines whether the calculated vibration frequency f1 is equal to or higher than a threshold frequency fth (step S320). The threshold frequency fth is a frequency at which the object near the cargo bed is estimated to have hardness such that collision with the vehicle cannot be permitted and can be determined by, for example, performing simulations or experiments in advance using steel and plastic. In a case where the vibration frequency f1 is lower than the threshold frequency fth (step S320: No), that is, in a case where the object near the cargo bed is estimated to have hardness such that collision with the vehicle can be permitted, the CPU 101 terminates the falling object determination processing.

On the other hand, in a case where the vibration frequency f1 is equal to or higher than the threshold frequency fth (step S320: Yes), that is, in a case where the object near the cargo bed is estimated to have hardness such that collision with the vehicle 500 cannot be permitted, the CPU 101 determines whether the amplitude a1 is equal to or greater than a threshold amplitude ath (step S330). As the amplitude a1 is greater, the height at which the object near the cargo bed floats from the cargo bed increases, and the object near the cargo bed is relatively displaced on the cargo bed because of movement of the nearby vehicle, thereby the object near the cargo bed is more likely to fall. The threshold amplitude ath is an amplitude at which the object near the cargo bed is estimated to be highly likely to fall from the cargo bed and can be determined by performing simulations or experiments in advance. The threshold amplitude ath is, for example, equal to or greater than 10% of a size (height) of the object near the cargo bed. In a case where the amplitude a1 is smaller than the threshold amplitude ath (step S330: No), that is, in a case where is the object near the cargo bed is less likely to fall from the cargo bed, the CPU 101 terminates the falling object determination processing.

On the other hand, in a case where the amplitude a1 is equal to or greater than the threshold amplitude ath (step S330: Yes), that is, in a case where the object near the cargo bed is highly likely to fall from the cargo bed, the CPU 101 determines whether the amplitude a1 is increasing (step S340).

In a case where the amplitude a1 is not increasing (step S340: No), the CPU 101 terminates the falling object determination processing. On the other hand, in a case where the amplitude a1 is increasing (step S340: Yes), the CPU 101 determines that the object near the cargo bed is an object which is likely to fall (step S350). More specifically, the CPU 101 sets the falling object determination flag Fe as Fe=1.

In a case where the object near the cargo bed is not located on the cargo bed (step S300: No), in the present embodiment, the CPU 101 determines whether the object near the cargo bed exists on a road (step S325). The CPU 101 can determine whether the object near the cargo bed exists on a road, for example, by determining whether an absolute value of an amount of displacement in a vertical direction obtained from trajectory of movement of the object near the cargo bed by using the first detection signal approximates a distance from the cargo bed to the road. In a case where the object near the cargo bed is located on the road (step S325: Yes), that is, in a case where the object near the cargo bed is not currently falling but has fallen, the CPU 101 terminates the falling object determination processing.

On the other hand, in a case where the object near the cargo bed is not located on the road (step S325: No), that is, in a case where the object near the cargo bed is currently falling, the CPU 101 calculates a size s1 of the object near the cargo bed (step S335). The CPU 101 may acquire the size s1 of the object near the cargo bed by using the cargo bed-nearby object information or the surrounding information. The size s1 is, for example, a height, a width, an area and a volume of the object near the cargo bed. Subsequently, the CPU 101 determines whether the size s1 is equal to or greater than a threshold sth (step S345). The threshold sth is a size such that collision between the object near the cargo bed and the vehicle 500 cannot be permitted and can be determined by performing simulations or experiments in advance.

In a case where the size s1 is smaller than the threshold sth (step S345: No), that is, in a case where the object near the cargo bed has a size such that collision with the vehicle 500 can be permitted, the CPU 101 terminates the falling object determination processing. On the other hand, in a case where the size s1 is equal to or greater than the threshold sth (step S345: Yes), that is, in a case where the object near the cargo bed has a size such that collision with the vehicle 500 cannot be permitted, the CPU 101 determines that the object near the cargo bed is an object which is falling (S355). More specifically, the CPU 101 sets the falling object determination flag Fe as Fe=2.

According to the falling object determination device 100 according to the first embodiment described above, at least one of the vibration frequency f1, the amplitude a1 and the size s1 of the object near the cargo bed is calculated by using the first detection signal, and in a case where collision between the object near the cargo bed and the vehicle 500 cannot be permitted in accordance with the calculation result, it is determined that the object near the cargo bed is an object which is likely to fall or an object which is falling. Thus, an object which is likely to fall and an object which is currently falling can be determined. Further, the falling object determination device 100 determines a falling object in a case where the object near the cargo bed is an object whose collide with the vehicle 500 cannot be permitted, so that it is possible to prevent excessive driving support which avoids an object whose collide with the vehicle 500 can be permitted and excessive driving support which avoids the vehicle from traveling near a vehicle on which the object is loaded. Further, the falling object determination device 100 determines the aspect of the driving support in a case where the object near the cargo bed is an object which is falling as the first driving support aspect and determines the aspect of the driving support in a case where the object near the cargo bed is an object which is likely to fall as the second driving support aspect, so that it is possible to determine the aspect of the driving support in accordance with a type of the object near the cargo bed.

B. Other Embodiments (1) While in the above-described embodiment, a control unit which executes the driving support processing and the moving object detection processing is implemented with software by the CPU 101 executing the driving support program Pr1 and the falling object determination program Pr3, the control unit may be implemented with hardware by an integrated circuit or a discrete circuit programmed in advance. In other words, the control unit and the method in the above-described embodiment may be implemented with a dedicated computer constituted with a processor and a memory which are programmed to execute one or a plurality of functions embodied by a computer program. Alternatively, the control unit and the method described in the present disclosure may be implemented by a dedicated computer which is provided by constituting a processor with a one or more dedicated hardware logic circuits. Alternatively, the control unit and the method described in the present disclosure may be implemented by one or more dedicated computers constituted with combination of a processor and a memory programmed to execute one or a plurality of functions and a processor constituted with one or more hardware logic circuits. Further, the computer program may be stored in a computer-readable non-transitory tangible recording medium as an instruction to be executed by the computer.

(2) In the above-described embodiment, the CPU 101 determines whether the object near the cargo bed is a falling object, in a case where the object near the cargo bed is an object whose collide with the vehicle cannot be permitted. Instead of this, the CPU 101 may determine whether the object near the cargo bed is a falling object regardless of whether the object near the cargo bed is an object whose collide with the vehicle 500 cannot be permitted. Specifically, for example, the processing in step S320, S335 and S345 in the above-described falling object determination processing may be omitted. By this means, it is possible to deal with a large variety of falling objects.

(3) In the above-described embodiment, in a case where the object near the cargo bed is located on the cargo bed (step S300: Yes), the CPU 101 determines whether collision between the object near the cargo bed and the vehicle 500 can be permitted in accordance with the vibration frequency of the object near the cargo bed in the falling object determination processing. Instead of or in addition to this, the CPU 101 may determine whether collision between the object near the cargo bed and the vehicle 500 can be permitted in accordance with the size of the object near the cargo bed. Further, the processing in step S330 and step S340 in the falling object determination processing may be omitted. In this case, in a case where collision between the object near the cargo bed and the vehicle 500 cannot be permitted, it is determined that the object near the cargo bed is an object which is likely to fall. Further, the processing in step S320 in the falling object determination processing may be omitted. In this case, the threshold amplitude ath is set at an amplitude at which the object near the cargo bed is estimated as an object whose collide with the vehicle 500 cannot be permitted.

(4) In the above-described embodiment, in a case where the object near the cargo bed is neither located on the cargo bed nor on a road (step S325: No) in the falling object determination processing, the CPU 101 determines whether collision between the object near the cargo bed and the vehicle 500 can be permitted in accordance with the size of the object near the cargo bed and determines whether the object near the cargo bed is an object which is falling. In other words, the CPU 101 determines that the object on the cargo bed is an object which is falling in a case where the size of the object on the cargo bed is equal to or greater than a predetermined size and the object on the cargo bed is neither an object which is likely to fall nor located on a road. Instead of or in addition to this, the CPU 101 may calculate falling speed of the object near the cargo bed and determine whether collision between the object near the cargo bed and the vehicle 500 can be permitted in accordance with the falling speed, and determine whether the object near the cargo bed is an object which is falling. For example, in a case where the falling speed is slow, the CPU 101 determines that the object near the cargo bed is an object like cloth or vinyl such that collide with the vehicle 500 can be permitted. Further, the CPU 101 may calculate the vibration frequency of the object near the cargo bed which is falling and determine whether collision between the object near the cargo bed the vehicle 500 cannot be permitted in accordance with the vibration frequency, and determine whether the object near the cargo bed is an object which is falling. More specifically, the CPU 101 may determine that the object near the cargo bed is an object which is falling in a case where the vibration frequency of the object near the cargo bed which is falling is equal to or lower than a first threshold determined in advance and equal to or higher than a second threshold which is lower than the first threshold. For example, the CPU 101 determines that the object near the cargo bed is an object like cloth or vinyl such that collide with the vehicle 500 can be permitted in a case where the vibration frequency is a low frequency equal to or higher than 1 Hz which is the first threshold, and determines that the object near the cargo bed is an object such as a metal such that collide with the vehicle 500 cannot be permitted in a case where the vibration frequency is approximately 0 Hz which is the second threshold.

While the present disclosure has been described above on the basis of the embodiments and modified examples, the above-described embodiments are provided to facilitate understanding of the present disclosure and do not limit the present disclosure. The present disclosure can be changed or modified without deviating from the gist and the scope of the claims, and the present disclosure includes equivalents thereof. For example, technical features in the embodiments and modified examples corresponding to technical features in respective embodiments described in summary of the invention can be replaced or combined as appropriate to solve part or all of the above-described problems or to achieve part or all of the above-described effects. Further, the technical features which are not described as essential features in the present specification, can be deleted as appropriate.

What is claimed is:

1. A falling object determination device configured to be mounted to an own vehicle, comprising:
    a processor;
    a non-transitory computer-readable storage medium; and
    a set of computer-executable instructions stored on the non-transitory computer-readable storage medium that cause the processor to:
        acquire, as a first detection signal, information indicating displacement of an object near a cargo bed of a nearby vehicle which travels near the own vehicle;
        calculate, as a calculation result, at least one of a vibration frequency, a vibration amplitude and a size of the object near the cargo bed by using the first detection signal, the vibration frequency indicating a hardness of the object, the vibration amplitude comprising a height that the object floats upward from the cargo bed, and the size of the object comprising at least one of a height, a width, an area and a volume of the object; and
        perform a determination whether the object near the cargo bed is an object which is likely to fall from the cargo bed or an object which is falling from the cargo bed based on the calculation result.

2. The falling object determination device according to claim 1,
    wherein the set of computer-executable instructions further cause the processor to perform the determination, in response to determining that a collision between the object near the cargo bed and the own vehicle cannot be permitted in accordance with the calculation result.

3. The falling object determination device according to claim 1,
    wherein the set of computer-executable instructions further cause the processor to determine that the object near the cargo bed is the object which is likely to fall from the cargo bed, in response to the vibration frequency being equal to or greater than a predetermined threshold.

4. The falling object determination device according to claim 1,
wherein the set of computer-executable instructions further cause the processor to determine that the object near the cargo bed is the object which is likely to fall from the cargo bed, in response to the vibration amplitude being equal to or greater than a predetermined threshold.

5. The falling object determination device according to claim 1,
wherein the set of computer-executable instructions further cause the processor to:
determine that a collision between the object near the cargo bed and the own vehicle cannot be permitted, in response to the size of the object near the cargo bed being equal to or greater than a predetermined size; and
determine that the object near the cargo bed is the object which is falling from the cargo bed, in response to the object being neither the object which is likely to fall in response to nor being located on a road.

6. The falling object determination device according to claim 5,
wherein the set of computer-executable instructions further cause the processor to determine that the object near the cargo bed is the object which is falling from the cargo bed, in response to the vibration frequency being equal to or lower than a first threshold predetermined and the vibration frequency being equal to or greater than a second threshold which is lower than the first threshold.

7. The falling object determination device according to claim 1,
wherein the set of computer-executable instructions further cause the processor to:
instruct an aspect of driving support to a driving support execution device which is provided at the own vehicle and which executes the driving support of the own vehicle;
determine the aspect of the driving support as a first driving support aspect in response to the object near the cargo bed being the object which is falling from the cargo bed; and
determine the aspect of the driving support as a second driving support aspect in response to the object near the cargo bed being the object which is likely to fall from the cargo bed, a degree of support in the second driving support aspect being lower than a degree of support in the first driving support aspect.

8. The falling object determination device according to claim 7,
wherein the first driving support aspect is an aspect in which support is performed to avoid the own vehicle from colliding with the object near the cargo bed.

9. The falling object determination device according to claim 7,
wherein the second driving support aspect is an aspect in which support is performed to increase a distance between the own vehicle and the nearby vehicle.

10. A driving support system configured to be mounted on a vehicle, comprising:
the falling object determination device according to claim 7;
a first detector configured to output the first detection signal; and
a driving support execution device configured to execute the aspect of the driving support.

11. A falling object determination method comprising:
acquiring, as a first detection signal, information indicating displacement of an object near a cargo bed of a nearby vehicle which travels near a vehicle; and
calculating, as a calculation result, at least one of a vibration frequency, a vibration amplitude and a size of the object near the cargo bed by using the first detection signal, the vibration frequency indicating a hardness of the object, the vibration amplitude comprising a height that the object floats upward from the cargo bed, and the size of the object comprising at least one of a height, a width, an area and a volume of the object; and
determining whether the object near the cargo bed is an object which is likely to fall from the cargo bed or an object which is falling from the cargo bed based on the calculation result.

12. A falling object determination device configured to be mounted to an own vehicle, comprising:
a processor;
a non-transitory computer-readable storage medium; and
a set of computer-executable instructions stored on the non-transitory computer-readable storage medium that cause the processor to:
acquire, as a first detection signal, information indicating displacement of an object near a cargo bed of a nearby vehicle which travels near the own vehicle;
determine whether at least part of the object near the cargo bed is on the cargo bed;
in response to determining that at least part of the object near the cargo bed is on the cargo bed, calculate, as a calculation result, at least one of a vibration frequency, a vibration amplitude and a size of the object near the cargo bed by using the first detection signal; and
perform a determination whether the object near the cargo bed is an object which is likely to fall from the cargo bed or an object which is falling from the cargo bed based on the calculation result.

13. The falling object determination device according to claim 12, wherein
determining whether at least part of the object near the cargo bed is on the cargo bed comprises:
detecting a predetermined range around a license plate of the nearby vehicle; and
determining whether at least part of the object is within the predetermined range.

* * * * *